United States Patent
Abramson et al.

(10) Patent No.: US 9,767,101 B2
(45) Date of Patent: Sep. 19, 2017

(54) MEDIA STORE WITH A CANONICAL LAYER FOR CONTENT

(71) Applicant: Google Inc., Mountain View, CA (US)

(72) Inventors: Andrew Abramson, Sunnyvale, CA (US); Benjamin David Poiesz, Santa Clara, CA (US)

(73) Assignee: GOOGLE INC., Mountain View, CA (US)

( * ) Notice: Subject to any disclaimer, the term of this patent is extended or adjusted under 35 U.S.C. 154(b) by 578 days.

(21) Appl. No.: 14/310,132

(22) Filed: Jun. 20, 2014

(65) Prior Publication Data
US 2015/0370796 A1 Dec. 24, 2015

(51) Int. Cl.
*G06F 17/30* (2006.01)

(52) U.S. Cl.
CPC .. *G06F 17/30038* (2013.01); *G06F 17/30017* (2013.01); *G06F 17/30029* (2013.01)

(58) Field of Classification Search
None
See application file for complete search history.

(56) References Cited

U.S. PATENT DOCUMENTS

| | | | |
|---|---|---|---|
| 6,199,068 B1 | 3/2001 | Carpenter | |
| 6,411,724 B1 * | 6/2002 | Vaithilingam | G06F 17/30038 382/100 |
| 7,568,148 B1 | 7/2009 | Bharat et al. | |
| 8,079,044 B1 * | 12/2011 | Craner | H04N 21/4532 725/28 |
| 8,661,069 B1 | 2/2014 | Cox et al. | |
| 8,676,866 B2 | 3/2014 | Lemcke et al. | |
| 9,201,889 B1 * | 12/2015 | Madany | G06F 17/30106 |
| 2005/0131870 A1 * | 6/2005 | Krishnaswamy | G06F 17/30551 |
| 2006/0212621 A1 * | 9/2006 | Ash | H04N 7/163 710/62 |
| 2007/0199025 A1 * | 8/2007 | Angiolillo | H04N 21/4113 725/47 |
| 2008/0222108 A1 * | 9/2008 | Prahlad | G06F 17/30616 |
| 2009/0063470 A1 * | 3/2009 | Peled | G06F 17/278 |
| 2009/0070370 A1 | 3/2009 | Cunningham et al. | |
| 2009/0083383 A1 * | 3/2009 | Piper | G06Q 10/101 709/206 |

(Continued)

FOREIGN PATENT DOCUMENTS

| | | |
|---|---|---|
| WO | 0103002 A2 | 1/2001 |
| WO | 2012075315 A1 | 6/2012 |

OTHER PUBLICATIONS

"PCT/US2015/035801", International Search Report and Written Opinion Issued in PCT/US2015/035801 on Aug. 27, 2015, Aug. 27, 2015, 10.

(Continued)

*Primary Examiner* — Richard Bowen
(74) *Attorney, Agent, or Firm* — Morris & Kamlay LLP (57) ABSTRACT

A media store, as disclosed herein, may be composed of one or more canonical documents. Each of the canonical documents may refer to one or more of content items. Each content item may be a source file for a specific piece of content such as a movie or song. The system may represent variants of the content items as a single document, the canonical document. A user may view one or more of the content items referred to in the canonical document.

18 Claims, 5 Drawing Sheets

(56) References Cited

U.S. PATENT DOCUMENTS

| | | | | |
|---|---|---|---|---|
| 2010/0042660 A1* | 2/2010 | Rinearson | ......... | G06F 17/30997 707/E17.116 |
| 2010/0104146 A1* | 4/2010 | Momosaki | ........ | G06F 17/30781 382/118 |
| 2010/0131499 A1* | 5/2010 | van Leuken | ........... | G06K 9/622 707/723 |
| 2010/0251099 A1 | 9/2010 | Makower et al. | | |
| 2011/0225156 A1* | 9/2011 | Pavlik | ............... | G06F 17/30038 707/737 |
| 2011/0246463 A1* | 10/2011 | Carson, Jr. | ........ | G06F 17/30705 707/737 |
| 2012/0030230 A1* | 2/2012 | Sheinkop | ............. | G11B 27/034 707/769 |
| 2012/0185759 A1* | 7/2012 | Balinsky | ............. | G06F 21/6227 715/209 |
| 2012/0210220 A1* | 8/2012 | Pendergast | ............ | G06F 3/0482 715/716 |
| 2012/0221595 A1* | 8/2012 | Slowe | .................... | G06Q 10/02 707/769 |
| 2013/0041877 A1* | 2/2013 | Parthasarathy | ... | G06F 17/30864 707/706 |
| 2013/0318629 A1* | 11/2013 | LaJoie | ............... | G06Q 30/0256 726/28 |
| 2014/0089132 A1 | 3/2014 | Pavlidis et al. | | |
| 2014/0189142 A1* | 7/2014 | Gouache | .......... | H04N 21/23439 709/231 |
| 2015/0052135 A1* | 2/2015 | Calkowski | .......... | G06F 17/3023 707/737 |
| 2015/0186538 A1* | 7/2015 | Yan | ................... | G06F 17/30997 707/722 |

OTHER PUBLICATIONS

International Preliminary Report on Patentability dated Dec. 29, 2016 as received in Application No. PCT/US2015/035801.

* cited by examiner

FIG. 6

MEDIA STORE WITH A CANONICAL LAYER FOR CONTENT

BACKGROUND

A digital media store may collect a variety of content items. The media store may catalog the content that it serves to users. Users of the media store may perform a search or browse content stored therein. The result for a query may show variations of the same core content as independent or unrelated content items. For example, a user may search for a particular movie and receive multiple results such as an explicit version, an uncut version, a clean version, and a director's cut. Each of the items may be represented to the user in a row or grid format. For example, each item may have its own stock keeping unit ("SKU").

BRIEF SUMMARY

According to an implementation, one or more content items may be received by a media store database. Each content item may be clustered based on an analysis of it. A canonical document may be generated for each of the plurality of clusters. A query may be received for one of the content items in the media store. At least one of the canonical documents may be identified in response to the query. The content items in the canonical documents returned in response to the query may be presented. Each of the canonical documents may be represented as a single document corresponding to the content items contained in one of the clusters.

In an implementation, a system is disclosed that includes a database for storing one or more content items. A processor may be connected to the database. The processor may be configured to receive one or more content items by the database. The processor may perform a clustering operation based on an analysis of each of the content items a media store has received. The processor may generate a one or more canonical documents. Each canonical document may correspond to one of the clusters of content items. A canonical document may contain a reference to content items contained in the cluster represented by the canonical document. The processor may receive a query for one or more content items. The processor may identify at least one of the canonical documents in response to the query. The processor may present the canonical documents identified in response to the query. Each of the canonical documents may be represented as a single document corresponding to the content items contained in one of the clusters.

A system and method are disclosed in which a canonical document may be generated for one or more content items. A first content item contained in the canonical document may differ from a second content item contained in the canonical document by one or more of a language, a format, a censorship, and a license. The content items may be associated with the canonical document. A query from a user device may be received in which the query is for the first of the plurality of content items. The first of the content items may be determined to be associated with the canonical document. A canonical representation of the content items associated with the canonical document may be provided to the user device in response to the query.

In an implementation, a system according to the presently disclosed subject matter includes a means for generating a canonical document for one or more content items. A first of the content items contained in the canonical document may vary from a second of the content items based on one or more of: a language, a format, a censorship, and a license. The system may include a means for associating the content items with the canonical document and a means for receiving a query from a user device for the first of the content items. The system may include a means for determining the first of the content items is associated with the canonical document. The system may include a means for providing a canonical representation of the content items associated with the canonical document to the user device in response to the query.

Additional features, advantages, and implementations of the disclosed subject matter may be set forth or apparent from consideration of the following detailed description, drawings, and claims. Moreover, it is to be understood that both the foregoing summary and the following detailed description provide examples of implementations and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Applications or media stores provide a variety of digital content to users (e.g., audio, video, book, magazine, application, etc.). As stated earlier, a movie, for example, may have several different versions such as an unrated version, a director's cut, international versions, high/standard definition format versions, etc. While each version of the movie is related, each version is often presented to a user as being unrelated or independent as the other. For example, each version of the movie may be displayed separately in a line in the media store or as a separate item in a list format. Moreover, the media store's database tends to be structured in such a way that each version is independent. As disclosed herein, all of the different versions may be represented by a canonical document. Thus, instead of showing a user each version of the movie, the user may be presented with a representation of the canonical document. As an example, a book may be available in fifty different languages. A single canonical document may refer to all fifty of the different language versions. The canonical document may be populated with different versions of the book as they are received from the publisher. Other data may be included in the canonical document, as described below.

Content searching may be improved as well because the system may search only canonical documents instead of having to search through every version of the same content. Consolidating versions of content (or representations thereof) into a single document can be time consuming if it is manually performed and would not be practical for newly adding content such as when a new album is available and a user would like to browse and/or purchase the album as soon as it is available. Manual curation and grouping, thus, would be time consuming to be scalable for a modern media store and all of its content. A publisher may provide some indication that content is related to or a version of another content item in the media store. However, this is only useful for new content that the publisher provides; it may not be applied retroactively to existing content in the media store.

Typically, a media store may only display to a user or ingest content that it can sell or otherwise serve to a user. The content items may be stored in a database as documents that have a 1:1 mapping to a representation of the content that a user can purchase, view, and/or install. As disclosed herein, the media store or a server connected thereto may perform reconciliation and/or clustering of content items algorithmically. For example, a French version of movie XYZ may be determined to be related to an Italian version of movie XYZ based on the metadata associated with the French and Italian versions. The clustering may utilize audio and/order video fingerprinting, OCR, or other techniques to determine whether content items stored in the database are related to other content items or newly added content items.

As disclosed herein, a canonical document may be generated. Rather than display or serve content items that are for sale, the canonical document permits the database to recognize canonical and variant SKUs or the like. For example, a music album may have four versions (e.g., explicit, explicitly with bonus content, clean, and clean with bonus content). These versions may already exist in the media store database. A canonical document may represent the album and have links to the variants. A user searches for a clean version of the album, the user may be presented with the same representation of the canonical document as another user who searches for an explicit version of the same album. The system may apply one or more rules to the canonical document that may determine which of the variants may be presented or otherwise available to a user of the media store (e.g., license permissions, country), for example, when a user selects the canonical document representation. Collections represented by the canonical documents may be merchandized irrespective of a user's location or preference (e.g., a user may prefer a clean version of an album over an explicit version). Moreover, a response to the query may be presented in an easier to view format because a canonical document would represent any other variant or version of the content related thereto. For example, instead of having four different versions of the same album appear in response to a query, only a canonical document corresponding to the four variants may be displayed to a user.

The system may allow greater flexibility to content that is not yet released for to the public or available in a particular region. For example, it may ingest a new, but not publicly available, content from a publisher and allow a user to add the content to a wish list. The system may notify the user when the content is available for consumption (e.g., purchase or viewing). Because a canonical document may be formed for the new release and all of its variant versions (e.g., a Spanish version, a Russian version), an administrator of the system may enable public consumption of the canonical document, thereby enabling users in different regions to consume the respective versions available in their locales. The administrator of the system (e.g., the media store), may utilize the canonical document to establish permissions for several documents rather than setting an access level for each specific variant of the content. Data regarding the performance of the variants (e.g., sales, views, rentals, recommendations, ratings, etc.) may be associated with the canonical document. The data for all of the variants may be aggregated and analyzed together such that all variants of a content item may be examined simultaneously for their performance globally.

Figure 3:
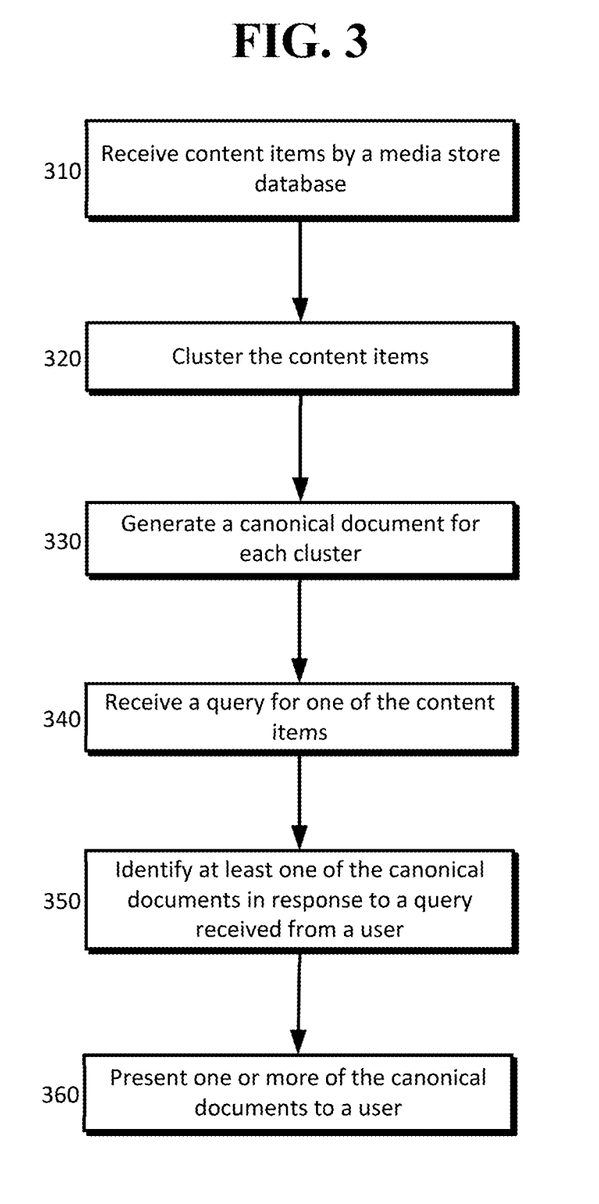
FIG. 3 shows a process for providing a canonical document or a representation thereof in response to a user's query according to an implementation.

In an implementation, one or more content items (e.g., a movie, a song, an album, a book, an application, etc.) may be received by a media store database, as shown in the example provided in FIG. 3 at 310. During an ingestion process, publishers and/or distributors of content may submit content to be served or hosted by the media store. The media store may serve a variety of digital content such as movies, songs, books, applications, etc. The media store may make the content available to users thereof for download, purchase, browsing, and/or social interactions. For example, a user may recommend a particular content item on the media store to a friend in the user's social network. The database may store other social interactions of users such as ratings, reviews, and/or recommendations of specific content items and/or developers connected thereto.

A clustering analysis may be performed on each content item ingested by the database at 320. The clustering may be performed utilizing a variety of techniques such as K-means clustering and/or a machine learning technique. Content may be analyzed for its metadata (e.g., title, length, size, actors, author, publisher/distributor), audio, video, text, etc. For example, a newly submitted content item may be an extended version of movie JRR. The metadata may indicate that the title is similar to that of an existing title in the media store database that may be the theatrical cut of the movie JRR. Similarly, the director, actors, publisher, etc. may be the same; however, the length may differ. An audio and/or video analysis may review a substantial overlap between the extended cut and theatrical cut of JRR. A clustering algorithm applied to one or more of these features may, with high confidence, indicate that the extended version of JRR is related to the theatrical cut of JRR. In some instances, manual curation may be performed on ingested or existing content to accommodate errors that may occur by the automated system. Thus, features of a content item may be utilized to associate it with a cluster of content items existing in the media store database. Members of a cluster may be related versions of content (e.g., alternative versions of a movie or album). A cluster may consist of one or more content items.

A canonical document may be generated for each cluster in the media store database at 330. The canonical document may contain a reference to content items contained in the cluster represented by the canonical document. The canonical document, for example, may contain a feature code, indication of the source document's location in the database (e.g., where the content item being referred to is located), and a SKU, for example, for each content item referred to in the canonical document.

In some configurations, the canonical document may include a canonical version of the data contained in the content items represented. For example, cover art, audio signature, video signature, text, metadata, etc. may be stored with the canonical document. Upon ingestion of a new content item, the media store may compare the new content item to the canonical document's version of the content items it represents. This may permit a faster association of new content items with a canonical document.

Figure 4:
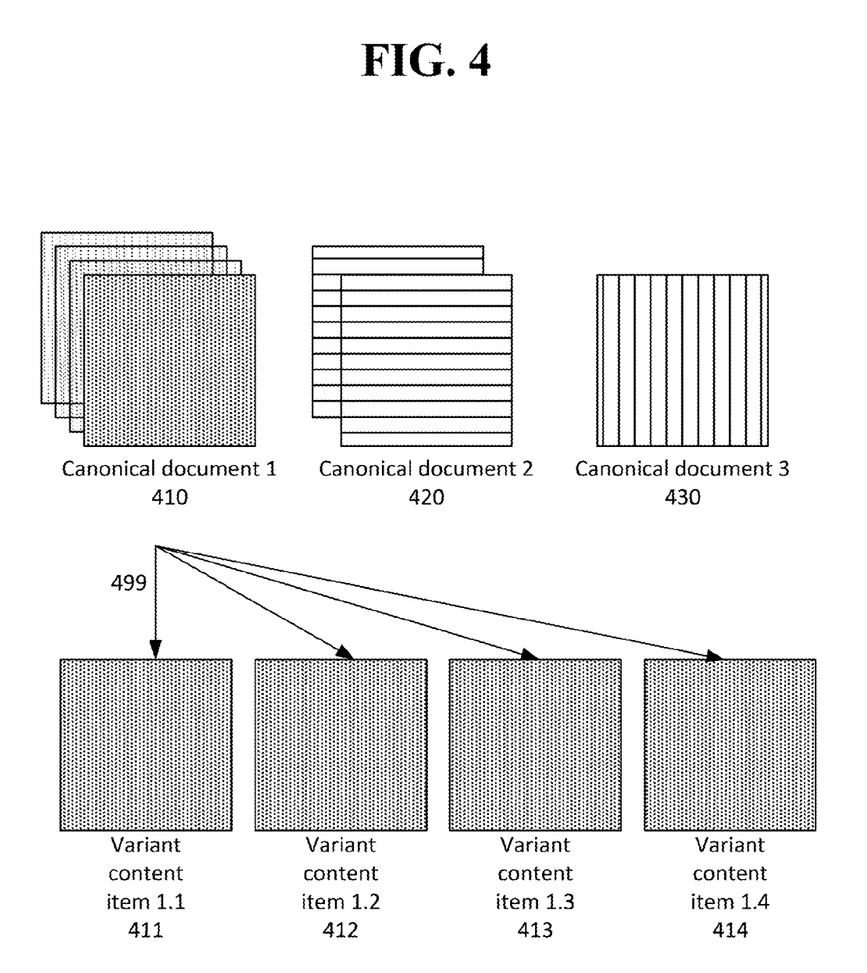
FIG. 4 is an example of a representation of a canonical document as disclosed herein.

A query may be received for one or more of the content items at 340. For example, a user may enter movie JRR as a query. The media store may identify one or more canonical documents as being relevant or a match for the query at 350. Rather than provide individual hits to specific content items in the media store database as a response to the query, the system may provide canonical documents that have been determined to match or be relevant to the query. In some configurations, the system may not present any specific content items at this step. Thus, one or more canonical documents, or a representation thereof, may be provided in response to the query at 360. For example, a canonical document may be represented as a stack of documents such as the representations of the three canonical documents 410, 420, 430 shown in FIG. 4. The representation of each canonical document may reflect the number of content items to which it refers. For example, canonical document 410 may refer to four documents, canonical document 2 420 to two documents, and canonical document 3 410 to one document. In some configurations, the representation may reflect the number of content items available to the particular user (e.g., based on the user's locale). A user may select the representation of the canonical document at 499 and the interface may change to display the content referred to in the canonical document. For example, each of the four variant versions referred to in canonical document 1 410 may be displayed 411, 412, 413, 414 to a user. The variant versions may be represented to a user in other ways as well such as in a list.

The canonical document may be utilized to filter the content items provided to a user. For example, an Italian version of a movie may not be permitted to be sold to the U.S. market due to licensing arrangements with the distributor. A consumer of the Italian version of the movie may, nonetheless, recommend the movie to an American consumer. If the American consumer views the recommendation, the system may, by virtue of the Italian and U.S. versions belonging to the same canonical document, be presented with the U.S. version of the movie or promotional material therefor. Other business rules may exist and be applied. As another example of a business rule, the media store may desire to promote a type of variant for content items over other types. For example, an analysis of sales for content items in the media store may indicate that explicit content is more frequently purchased than a corresponding censored variant of the content item. The media store, upon displaying the content items available for a canonical document may show or present the explicit variant of the canonical document to the user ahead of other variants that may sell less. Thus, the canonical document may cause the presentation of content to a user of the media store to be seamlessly altered according to one or more rules specified by the system or a user preference (e.g., a language preference, a location, etc.).

Figure 5:
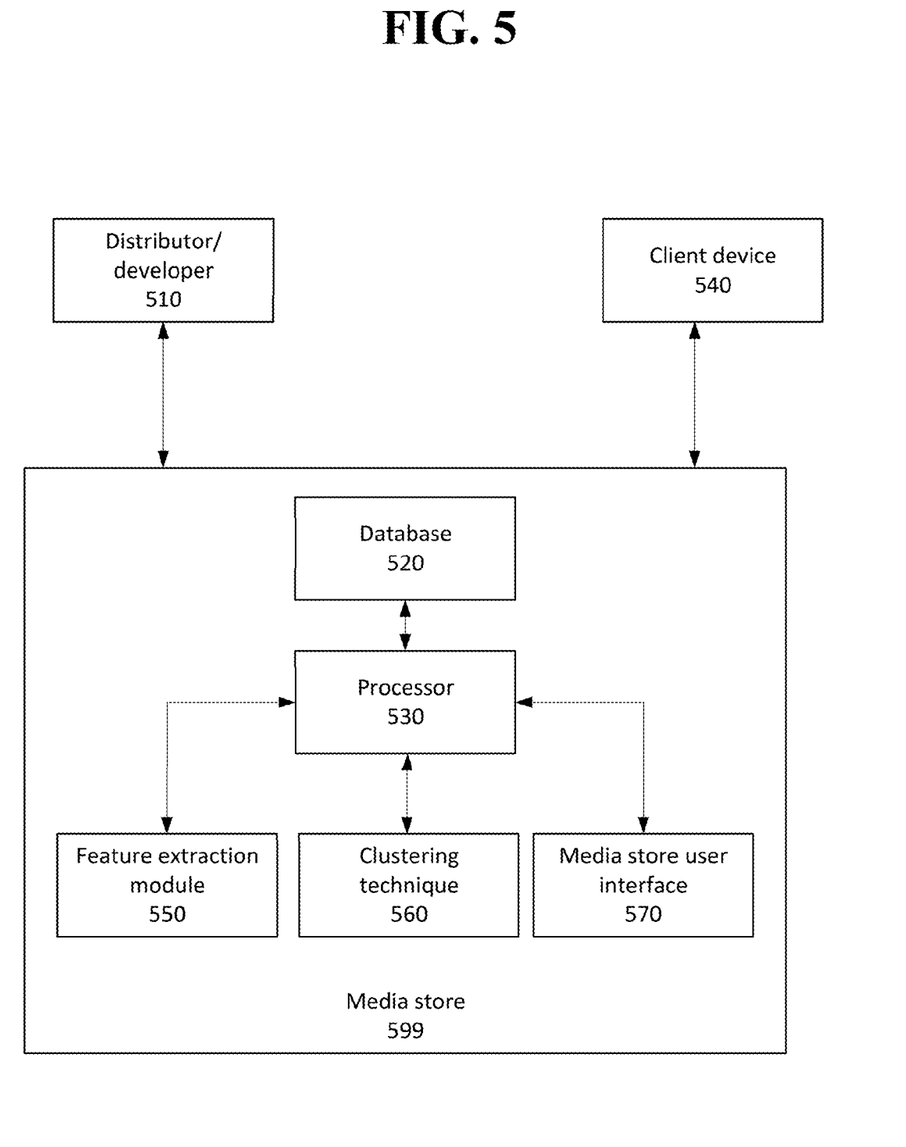
FIG. 5 is an example system for providing a canonical document or a representation thereof in response to a user's query according to an implementation.

In an implementation, an example of which is provided in FIG. 5, a system is disclosed that includes a database 520 for storing one or more content items and a processor 530 connected thereto. The database 520 and processor 530 may be components of a media store 599 that serves and/or hosts content items for users. The content items may be received by the media store 599 from a distributor/developer 510. The processor 530 may receive one or more content items as described above. The processor 530 may cluster the content items received based on features extracted from each content items (e.g., metadata, audio analysis, video analysis, etc.). The media store 599 may include a feature extraction module 550 that determines and/or extracts features for each ingested content item. In FIG. 5, the database 520, feature extraction module 550, and clustering technique 560 are shown as components of the media store 599; however, they may be separate from the media store 599. The feature extraction module 550 and clustering technique 560, may not communicate with the media store's processor 530. The clustering technique 560 may refer to, for example a clustering algorithm that may be applied by a processor 530 to ingested content and/or features extracted therefrom.

The processor 530 may be configured to generate one or more canonical documents. Each canonical document that the system generates may correspond to a cluster of content items. The content items in a cluster may be related to one another because, for example, they are variant versions of each other. Users of the system may browse content on the media store 599 with a device 540 such as a tablet, smartphone, laptop, etc. As described above, not all of the content may be consumable by a user such as items not yet for sale. A user may submit a query to the system for one or more content items. The system may identify one or more canonical documents stored in the database 520 in response to the query. A representation of the canonical documents that match or relate to the query may be presented to a client device 540 for the user. Each of the canonical documents may be represented as a single document that, when selected by a user expands to show the user a representation of the content items to which the canonical document refers. Not all of the content items represented by the canonical document may be shown to the user. For example, if a business rule prohibits a locale from showing a particular variant of content.

Figure 6:
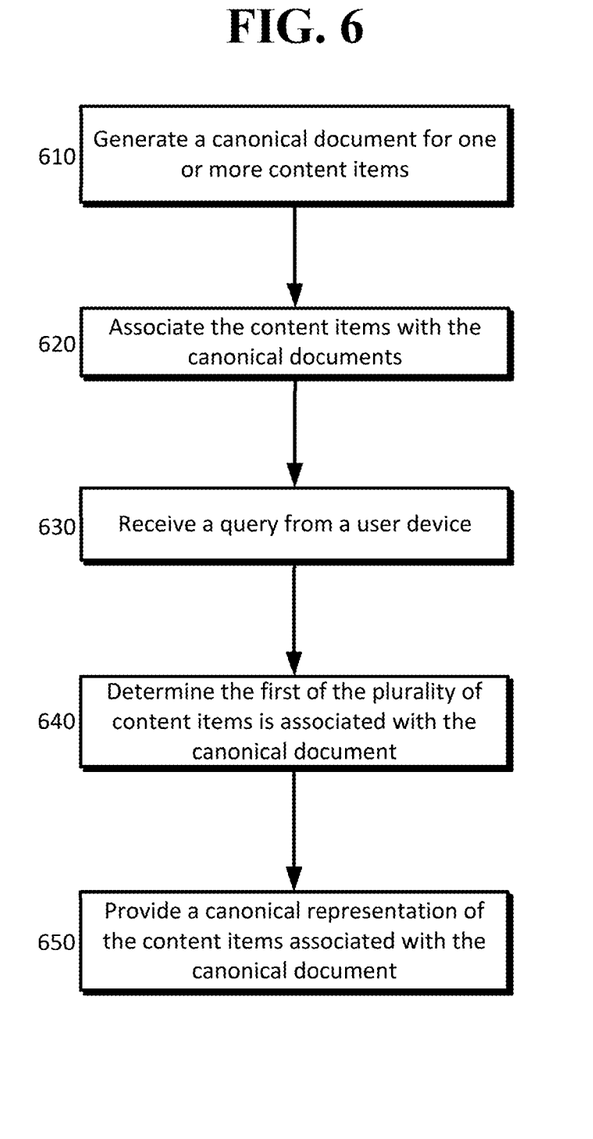
FIG. 6 shows an example process for generating a canonical document and providing it to a user as disclosed herein.

In an implementation, an example of which is provided in FIG. 6, a canonical document for one or more content items may be generated at 610. A first of the content items contained or represented in the canonical document may differ from a second of the content items based on one or more features such as a language, a format, a content rating (e.g., censorship), a license, etc. The canonical document may contain a reference to each content item such as a SKU. The content item source file or document may be stored in a database separate from the canonical document. One or more content items may be associated with the canonical document at 620. For example, during content ingestion, a SKU may be assigned to each content item. The SKU may be included or referred to in the canonical document. When a user accesses the canonical document or a representation thereof, the system may display one or more of the content items based on the SKUs contained in the document as described earlier. The system may, therefore, receive a query from a user device for one or more content items at 630 and determine that a first of the content items is associated with the canonical document at 640. For example, a search may return movie ABC as being most relevant to a user's query. Movie ABC may be associated with canonical document ABC. Thus, the media store may provide the canonical document, instead of the content item, for movie ABC. As stated earlier, the media store may perform a search of its database for relevant matches to the query among the canonical documents rather than specific content items. Whether the media store searches content items only, canonical documents only, or both content items and canonical documents, it may provide a representation of one or more canonical documents that have been determined to be relevant to the query at 650. If a user selects the canonical representation, the representation may expand to show one or more canonical documents referred to in the selected canonical document.

Figure 1:
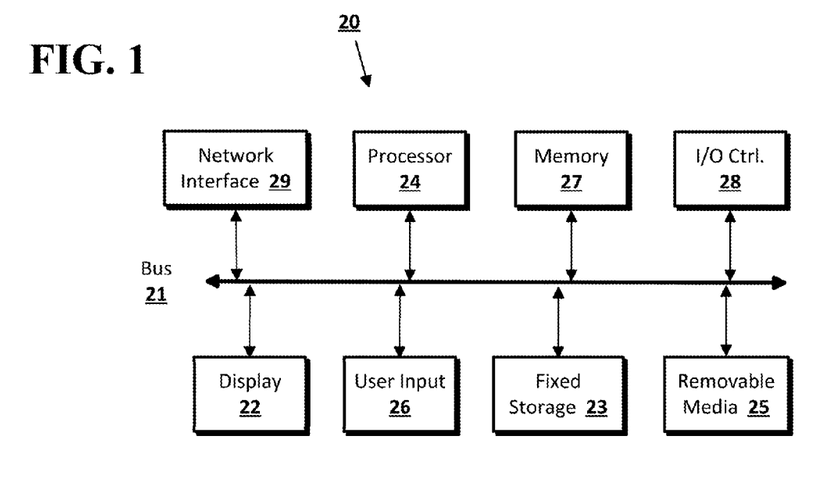
FIG. 1 shows a computer according to an implementation of the disclosed subject matter.

Implementations of the presently disclosed subject matter may be implemented in and used with a variety of component and network architectures. FIG. 1 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
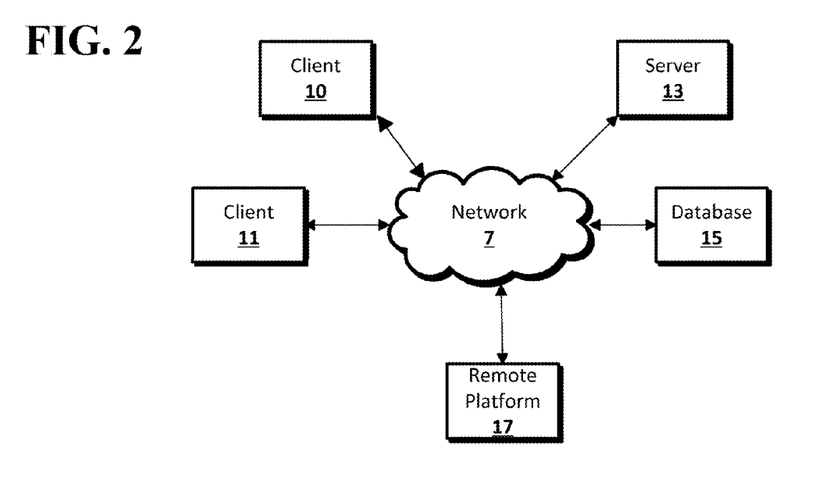
FIG. 2 shows a network configuration according to an implementation of the disclosed subject matter.

FIG. 2 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

In situations in which the implementations of the disclosed subject matter collect personal information about users, or may make use of personal information, the users may be provided with an opportunity to control whether programs or features collect user information (e.g., a user's provided input, a user's geographic location, and any other similar data associated with a user), or to control whether and/or how to receive data from a provider that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by systems disclosed herein.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method, comprising:
   receiving a plurality of content items by a media store database;
   clustering, by a media store, the plurality of content items contained in the media store database to form a plurality of clusters;
   generating, by the media store, a plurality of canonical documents, wherein a canonical document corresponds to one cluster of the plurality of clusters and contains a reference to content items contained in the one cluster, the content items contained in the one cluster being related versions of content items, the canonical document having a plurality of variants;
   presenting, by the media store and to a first user, a first variant, of the plurality of variants, of the canonical document, wherein the first variant includes a first content item of the one cluster;
   receiving, by the media store and from a second user in response to the second user having received, from the first user, a recommendation for the first content item, a query for the first content item;
   identifying, by the media store and for the second user, a second content item of the one cluster, the identifying being in response to the query and an unavailability, to the second user, of the first content item; and
   presenting, by the media store, to the second user, and in response to the query, a second variant, of the plurality of variants, of the canonical document, wherein the second variant excludes the first content item.

2. The method of claim 1, further comprising performing, by the media store, at least one of an audio, a video, or a text analysis of a first one of the plurality of content items and a second one of the plurality of content items.

3. The method of claim 2, further comprising:
   determining, by the media store, that the first one of the plurality of content items matches the second one of the plurality of content items based on the at least one of the audio, the video, or the text analysis; and
   deeming, by the media store, the first one of the plurality of content items and the second one of the plurality of content items as related content based on a determination of a match between the first one of the plurality of content items and the second one of the plurality of content items.

4. The method of claim 1, further comprising filtering, by the media store, the plurality of content items contained in at least one of the plurality of clusters represented by at least one of the plurality of canonical documents based on one or more of a license, a location, a language, or a business rule.

5. The method of claim 1, wherein the recommendation is conveyed via a social media network.

6. The method of claim 1, wherein the unavailability, to the second user, of the first content item is based on at least one of a location of the second user, a language of the second user, a language of the first content item, a business rule that renders the first content item unavailable to the second user, or a license agreement that excludes the second user.

7. A system, comprising:
   a database configured to store a plurality of content items;
   a processor connected to the database, the processor configured to:
      receive the plurality of content items;
      cluster the plurality of content items contained in the database to form a plurality of clusters;
      generate a plurality of canonical documents, wherein a canonical document corresponds to one cluster of the plurality of clusters and contains a reference to content items contained in the one cluster, the content items contained in the one cluster being related versions of content items, the canonical document having a plurality of variants;
      present, to a first user, a first variant, of the plurality of variants, of the canonical document, wherein the first variant includes a first content item of the one cluster;
      receive, from a second user in response to the second user having received, from the first user, a recommendation for the first item, a query for the first content item;
      identify, for the second user, a second content item of the one cluster, such identifying being in response to the query and an unavailability, to the second user, of the first content item; and
      present, to the second user and in response to the query, a second variant, of the plurality of variants, of the canonical document, wherein the second variant excludes the first content item.

8. The system of claim 7, wherein the processor is further configured to perform at least one of an audio, a video, or a text analysis of a first one of the plurality of content items and a second one of the plurality of content items.

9. The system of claim 8, wherein the processor is further configured to:
   determine that the first one of the plurality of content items matches the second one of the plurality of content items based on the at least one of the audio, the video, or the text analysis; and
   deem the first one of the plurality of content items and the second one of the plurality of content items as related content based on a determination of a match between the first one of the plurality of content items and the second one of the plurality of content items.

10. The system of claim 7, wherein the processor is further configured to filter the plurality of content items contained in at least one of the plurality of clusters represented by the at least one of the plurality of canonical documents based on one or more of a license, a location, a language, or a business rule.

11. The system of claim 7, wherein the recommendation is conveyed via a social media network.

12. The system of claim 7, wherein the unavailability, to the second user, of the first content item is based on at least one of a location of the second user, a language of the second user, a language of the first content item, a business rule that renders the first content item unavailable to the second user, or a license agreement that excludes the second user.

13. A method, comprising:
   generating, by a media store, a canonical document for a first plurality of content items, wherein a first content item of the first plurality of content items is different from a second content item of the first plurality of content items based on at least one of: a language, a format, a censorship, or a license, content items of the first plurality of content items being related versions of content items, the canonical document having a plurality of variants;

associating, by the media store, the first plurality of content items with the canonical document;

presenting, by the media store and to a first user device, a first variant, of the plurality of variants, of the canonical document, wherein the first variant includes the first content item;

receiving, by the media store and from a second user device in response to the second user device having received, from the first user device, a recommendation for the first content item, a query for the first content item;

identifying, by the media store and for the second user device, the second content item, the identifying being in response to the query and an unavailability, to a user of the second user device, of the first content item; and providing, by the media store, to the second user device, and in response to the query, a second variant, of the plurality of variants, of the canonical document, wherein the second variant excludes the first content item.

14. The method of claim 13, further comprising:

receiving, by the media store, a selection of a representation of the canonical document of the first plurality of content items; and expanding, by the media store, the representation of the canonical document to display two or more of the first plurality of content items associated with the canonical document.

15. The method of claim 13, further comprising:

receiving, by the media store, a second plurality of content items; and clustering, by the media store, the first plurality of content items and the second plurality of content items to form a first cluster corresponding to the first plurality of content items and a second cluster corresponding to the second plurality of content items.

16. The method of claim 13, further comprising:

assigning, by the media store, a unique stock keeping unit for a corresponding content item of the first plurality of content items; and determining, by the media store, a canonical stock keeping unit for the first plurality of content items that represents unique stock keeping units for the first plurality of content items.

17. The system of claim 13, wherein the receiving the recommendation is conveyed via a social media network.

18. The method of claim 13, wherein the unavailability, to the user of the second device, of the first content item is based on at least one of a location of the user of the second device, a language of the user of the second device, a language of the first content item, a business rule that renders the first content item unavailable to the user of the second device, or a license agreement that excludes the user of the second device.

* * * * *